US012720429B2

(12) United States Patent
He

(10) Patent No.: US 12,720,429 B2
(45) Date of Patent: Aug. 25, 2026

(54) METHOD AND APPARATUS FOR DETERMINING A TIME WINDOW, AND CHIP

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 314 days.

(21) Appl. No.: 18/399,542

(22) Filed: Dec. 28, 2023

(65) Prior Publication Data

US 2024/0129851 A1 Apr. 18, 2024

Related U.S. Application Data

(63) Continuation of application No. PCT/CN2021/114683, filed on Aug. 26, 2021.

(51) Int. Cl.
*H04W 52/02* (2009.01)

(52) U.S. Cl.
CPC ... *H04W 52/0216* (2013.01); *H04W 52/0229* (2013.01)

(58) Field of Classification Search
CPC ......... H04W 52/0216; H04W 52/0229; H04W 52/0219; H04W 52/0235; H04W 52/028; H04W 68/02; H04W 76/27; Y02D 30/70
See application file for complete search history.

(56) References Cited

U.S. PATENT DOCUMENTS

| | | | | |
|---|---|---|---|---|
| 11,234,191 | B2 * | 1/2022 | Lin | H04W 52/0229 |
| 2020/0229092 | A1 * | 7/2020 | Wu | H04W 76/28 |
| 2022/0046585 | A1 * | 2/2022 | Wu | H04L 5/0094 |
| 2022/0124624 | A1 * | 4/2022 | Sha | H04W 52/0229 |
| 2022/0271878 | A1 * | 8/2022 | Lin | H04W 68/02 |
| 2022/0394526 | A1 * | 12/2022 | Wang | H04W 72/0446 |
| 2023/0017853 | A1 * | 1/2023 | Xu | H04W 72/12 |
| 2023/0108646 | A1 * | 4/2023 | Tseng | H04W 68/025 455/458 |
| 2024/0073859 | A1 * | 2/2024 | Sogabe | H04W 52/028 |
| 2024/0073864 | A1 * | 2/2024 | Nagano | H04W 52/0229 |

(Continued)

FOREIGN PATENT DOCUMENTS

CN 113163476 A 7/2021

OTHER PUBLICATIONS

Supplementary European Search Report in the European application No. 21954538.1, mailed on Jul. 2, 2024. 11 pages.

(Continued)

*Primary Examiner* — Will W Lin
(74) *Attorney, Agent, or Firm* — BAYES PLLC

(57) ABSTRACT

A method and apparatus for determining a time window, and a chip are provided. The method includes that: a terminal device determines a target time window for monitoring a power saving signal. The target time window includes at least one monitoring occasion. A position of the target time window is determined based on at least one of a position of a target synchronization signal/physical broadcast channel block (SSB) set or a position of a target paging unit.

20 Claims, 6 Drawing Sheets

(56) References Cited

U.S. PATENT DOCUMENTS

2024/0163842 A1* 5/2024 Berggren .......... H04W 52/0235
2024/0349241 A1* 10/2024 Su ......................... H04W 68/02

OTHER PUBLICATIONS

Moderator (Mediatek): "Summary#4 of Paging Enhancements", 3GPP Draft; R1-2108495, 3rd Generation Partnership Project (3GPP), Mobile Competence Centre; 650, Route Des Lucioles; F-06921 Sophia-Antipolis Cedex; France vol. RAN WG1, No. e-Meeting; Aug. 16, 2021-Aug. 27, 2021, Aug. 25, 2021 (Aug. 25, 2021), XP052042782, the whole document.

CATT: "Details of PEI configuration", 3GPP Draft; R1-2106985, 3rd Generation Partnership Project (3GPP), Mobilecompetence Centre; 650, Route Des Lucioles; F-06921 Sophia-Antipolis Cedex; France vol. RAN WG1, No. e-Meeting; Aug. 16, 2021-Aug. 27, 2021, Aug. 7, 2021 (Aug. 7, 2021), XP052038158, the whole document.

Moderator (Mediatek): "Summary of Paging Enhancements", 3GPP Draft; R1-2106143, 3rd Generation Partnership Project (3GPP), Mobile Competence Centre; 650, Route Des Lucioles; F-06921 Sophia-Antipolis Cedex; France vol. RAN WG1, No. e-Meeting; May 10, 2021-May 27, 2021, Jun. 2, 2021 (Jun. 2, 2021), XP052019153, the whole document.

3GPP TSG RAN WG1 #106-e R1-2106983, e-Meeting, Aug. 16-27, 2021, Source: CATT, Title: Paging enhancement for UE power saving, Agenda Item: 8.7.1.1, Document for: Discussion and Decision. pp. 1-36.

3GPP TSG RAN WG1 #105-e R1-2104787, e-Meeting, May 10-27, 2021, Source: OPPO, Title: Further discussion on Paging enhancements for power saving, Agenda Item: 8.7.1.1, Document for: Discussion. pp. 1-6.

OPPO. "Further discussion on Paging enhancements for power saving", 3GPP TSG RAN WG1 #106-e R1-2107253, Aug. 7, 2021 (Aug. 7, 2021), section 2.1, and figure 1. 6 pages.

Huawei et al. "Paging enhancements for UE power saving in IDLE/inactive mode", 3GPP TSG RAN WG1 Meeting #106-e R1-2106479, Aug. 7, 2021 (Aug. 7, 2021), section 3.1, and figure 6. 18 pages.

ZTE et al. "Discussion on power saving enhancements for paging", 3GPP TSG RAN WG1 #106-e R1-2106521, Aug. 7, 2021(Aug. 7, 2021), section 3.3, and figures 7 and 8. 30 pages.

International Search Report in the international application No. PCT/CN2021/114683, mailed on Dec. 22, 2021. 5 pages with English translation.

Written Opinion of the International Search Authority in the international application No. PCT/CN2021/114683, mailed on Dec. 22, 2021. 9 pages with English translation.

"3rd Generation Partnership Project; Technical Specification Group Radio Access Network; NR; User Equipment (UE) procedures in Idle mode and RRC Inactive state (Release 16)", 3GPP TS 38.304 V16.0.0 (Mar. 2020), section 7.1. 36 pages.

"3rd Generation Partnership Project; Technical Specification Group Radio Access Network; NR; Physical layer procedures for control (Release 16)", 3GPP TS 38.213 V16.2.0 (Jun. 2020), section 10.3, 4. 176 pages.

"3rd Generation Partnership Project; Technical Specification Group Radio Access Network; NR; Radio Resource Control (RRC) protocol specification (Release 16)", 3GPP TS 38.331 V16.3.1 (Jan. 2021), pp. 420-422, 929 pages.

"3rd Generation Partnership Project; Technical Specification Group Radio Access Network; NR; Radio Resource Control (RRC) protocol specification (Release 16)", 3GPP TS 38.331 V16.1.0 (Jul. 2020), pp. 421. 902 pages.

First Office Action of the European application No. 21954538.1, issued on Mar. 31, 2025. 7 pages.

* cited by examiner

Position for monitoring the power saving signal
DRX active time
Minimum time interval
PS-offset DRX cycle
......
PF
PO Power saving signal indicates monitoring a paging PDCCH
Power saving signal indicates not monitoring a paging PDCCH
Power saving signal indicates monitoring a paging PDCCH
PO or PF
PO or PF
PO or PF

FIG. 7

Apparatus for determining a time window

Determination unit 1101

METHOD AND APPARATUS FOR DETERMINING A TIME WINDOW, AND CHIP

CROSS-REFERENCE TO RELATED APPLICATION

This is a continuation of International Patent Application No. PCT/CN2021/114683, filed on Aug. 26, 2021, the contents of which is hereby incorporated by reference in its entirety.

BACKGROUND

In order to optimize power saving of a terminal device in a paging mechanism, a power saving signal is introduced. The power saving signal is transmitted before a paging occasion (PO) and used for indicating the terminal device whether to monitor a paging physical downlink control channel (PDCCH) in the PO.

SUMMARY

Embodiments of the disclosure relate to the technical field of mobile communications, and particularly to a method and apparatus for determining a time window, and a chip.

An embodiment of the disclosure provides a method for determining a time window, which includes the following operations.

A target time window for monitoring a power saving signal is determined by a terminal device. The target time window includes at least one monitoring occasion. A position of the target time window is determined based on at least one of a position of a target synchronization signal/physical broadcast channel block (SSB) set or a position of a target paging unit.

An embodiment of the disclosure provides an apparatus for determining a time window, which is applied to a terminal device and includes a processor and a memory for storing a computer program.

The processor is configured to call the computer program stored in the memory and run the computer program to determine a target time window for monitoring a power saving signal. The target time window includes at least one monitoring occasion. A position of the target time window is determined based on at least one of a position of a target SSB set or a position of a target paging unit.

An embodiment of the disclosure provides a chip configured to perform the above method for determining a time window.

Specifically, the chip includes a processor configured to call a computer program stored in a memory and run the computer program, to cause a device mounted with the chip to determine a target time window for monitoring a power saving signal. The target time window includes at least one monitoring occasion. A position of the target time window is determined based on at least one of a position of a target SSB set or a position of a target paging unit.

BRIEF DESCRIPTION OF THE DRAWINGS

The accompanying drawings, which are illustrated herein to provide a further understanding of the disclosure, constitute a part of the disclosure. The exemplary embodiments of the disclosure and their description are used to explain the disclosure and not intended to unduly limit the disclosure.

FIG. 7 is a schematic flowchart of a method for determining a time window according to an embodiment of the disclosure.

DETAILED DESCRIPTION

Technical solutions in the embodiments of the disclosure will be described below with reference to the accompanying drawings in the embodiments of the disclosure. It is apparent that the described embodiments are some embodiments of the disclosure rather than all of the embodiments. All other embodiments obtained by a person of ordinary skill in the art based on the embodiments of the disclosure without paying creative efforts shall fall within the scope of protection of the disclosure.

Figure 1:
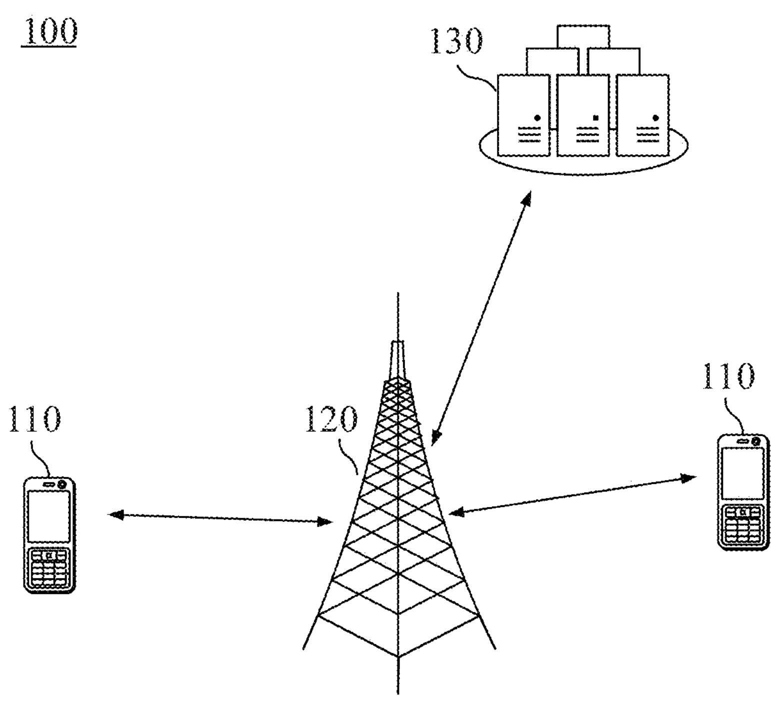
FIG. 1 is a schematic diagram of an application scenario in an embodiment of the disclosure.

FIG. 1 is a schematic diagram of an application scenario in an embodiment of the disclosure.

As illustrated in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the embodiments of the disclosure are illustrated by using the communication system 100 as an example only, and the embodiments of the disclosure are not limited thereto. In other words, the technical solutions of the embodiments of the disclosure may be applied to various communication systems, such as a long term evolution (LTE) system, an LTE time division duplex (TDD) system, a universal mobile telecommunications system (UMTS), an Internet of things (IoT) system, a narrow band Internet of things (NB-IoT) system, an enhanced machine-type communication (eMTC) system, a 5-th generation (5G) communication system (also called a new radio (NR) communication system), or a future communication system, etc.

In the communication system 100 illustrated in FIG. 1, the network device 120 may be an access network device that communicates with the terminal device 110. The access network device may provide a communication coverage for a particular geographic area, and may communicate with the terminal device 110 (such as user equipment (UE)) located within the coverage area.

The network device 120 may be an evolutional node B (eNB or eNodeB) in an LTE system, a next generation radio access network (NG RAN) device, a base station in an NR system (gNB), or a wireless controller in a cloud radio access network (CRAN); or the network device 120 may be a relay station, an access point, an in-vehicle device, a wearable device, a hub, a switch, a network bridge, a router, a network device in a future evolved public land mobile network (PLMN) or the like.

The terminal device 110 may be any terminal device including but not limited to a terminal device connected with the network device 120 or other terminal devices in a wired or wireless manner.

For example, the terminal device 110 may be an access terminal, UE, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, an IoT device, a satellite handheld terminal, a wireless local loop (WLL) station, a personal digital assistant (PDA), a handheld device having a wireless communication function, a computing device or other processing devices connected to a wireless modem, an in-vehicle device, a wearable device, a terminal device in a 5G network, a terminal device in a future evolved network or the like.

The terminal device 110 may be applicable to a device to device (D2D) communication.

The wireless communication system 100 may further include a core network device 130 that communicates with the base station. The core network device 130 may be a 5G core (5GC) device, for example, an access and mobility management function (AMF), an authentication server function (AUSF), a user plane function (UPF), or a session management function (SMF). Optionally, the core network device 130 may also be an evolved packet core (EPC) device in an LTE network, for example, a session management function+core packet gateway (SMF+PGW-C) device. It should be understood that the SMF+PGW-C may achieve functions of both the SMF and PGW-C. In a process of network evolution, the core network device may also have other names, or the functions of the core network may be divided to form a new network entity, which are not limited by the embodiments of the disclosure.

Various functional units in the communication system 100 may also be connected with each other through a next generation (NG) interface, to realize communications.

For example, the terminal device may establish an air interface connection with the access network device through an NR interface, to transmit user plane data and control plane signaling. The terminal device may establish a control plane signaling connection with the AMF through an NG interface 1 (N1 for short). The access network device such as a next generation radio access base station (gNB) may establish a user plane data connection with the UPF through an NG interface 3 (N3 for short). The access network device may establish a control plane signaling connection with the AMF through an NG interface 2 (N2 for short). The UPF may establish a control plane signaling connection with the SMF through an NG interface 4 (N4 for short). The UPF may interact user plane data with a data network through an NG interface 6 (N6 for short). The AMF may establish a control plane signaling connection with the SMF through an NG interface 11 (N11 for short). The SMF may establish a control plane signaling connection with the PCF through an NG Interface 7 (N7 for short).

FIG. 1 illustrates one base station, one core network device and two terminal devices as an example. Optionally, the wireless communication system 100 may include multiple base stations, and coverage of each base station may include another number of terminal devices, which is not limited in the embodiment of the disclosure.

It should be noted that FIG. 1 illustrates the system to which the disclosure applies only by way of example, and the method in the embodiments of the disclosure may also be applicable to other systems. Moreover, terms "system" and "network" in the disclosure are usually interchangeably used. The term "and/or" in the disclosure is only used for describing an association relationship between associated objects, and represents that three relationships may exist, for example, A and/or B may represent the following three cases: A exists separately, both A and B exist, and B exists separately. In addition, the character "/" in this specification generally indicates an "or" relationship between the associated objects. It should also be understood that the word "indication" mentioned in the embodiments of the disclosure may be a direct indication or an indirect indication, and may also be indicative of an association relationship. For example, A indicates B, which may represent that A directly indicates B, for example, B may be obtained through A; or that A indirectly indicates B, for example, A indicates C, and B may be obtained through C; or that there is an association between A and B. It should also be understood that the word "correspondence" in the embodiments of the disclosure may represent that the listed items have a direct or indirect correspondence, or that the listed items have an association relationship, or represent a relationship of indicating and being indicated, configuring and being configured, etc. It should also be understood that the phrase "predefined" or "predefined rule" mentioned in the embodiments of the disclosure may be implemented by pre-storing corresponding codes, tables, or other means that may be used for indicating relevant information in devices (such as the terminal device and the network device), and the specific implementation is not limited in the disclosure. For example, predefinition may refer to being defined in the protocol. It should also be understood that in the embodiments of the disclosure, the "protocol" may be a standard protocol in the communication field, such as an LTE protocol, an NR protocol, and related protocols applied in a future communication system, which are not limited herein.

For ease of understanding the technical solutions in the embodiments of the disclosure, related technologies involved in the embodiments of the disclosure are described below. The following related technologies are used as optional solutions and may be combined with the technical solutions in the embodiments of the disclosure in various ways, and the combination falls within the scope of protection of the embodiments of the disclosure.

Discontinuous Reception (DRX)

In order to reduce power consumption of a terminal device, a DRX mechanism is introduced, which enables the terminal device to enter a discontinuous reception state instead of turning on a receiver all the time when no data is received, thereby achieving the purpose of power saving. In the DRX mechanism, a DRX cycle is configured for a terminal device in a radio resource control (RRC) connected state, and the DRX cycle consists of an “On Duration (corresponding to DRX active time)” and an “Opportunity for DRX (corresponding to DRX inactive time)”. During the “On Duration”, the terminal device monitors and receives a downlink channel including PDCCH and a downlink signal. During the “Opportunity for DRX”, the terminal device receives no downlink channel such as the PDCCH and the downlink signal, to save the power consumption. The terminal device in an RRC idle state needs to receive a paging message in a way similar to that of the DRX mechanism. A paging occasion (PO) is present in a DRX cycle. The terminal device only monitors a paging PDCCH and the paging message in the PO, and does not monitor the paging PDCCH and does not receive the paging message in the time outside the PO, so as to achieve the purpose of electricity saving. During the PO, the terminal device determines whether there is a paging message by detecting the paging PDCCH scrambled by a paging-radio network temporary identity (P-RNTI).

In the evolution of 5G, higher requirements are put forward for the power saving of the terminal device. For example, in the existing DRX mechanism, the terminal device needs to continuously detect the PDCCH during each On duration to determine whether the base station schedules a data transmission to the terminal device. However, although no data transmission may need to be received for a long time for most terminal devices, they are still necessary to maintain a regular wake-up mechanism to monitor possible downlink transmissions. The power saving for such terminal devices may be further optimized. The situation is similar for the terminal device receiving the paging message in the RRC idle state.

Figure 2:
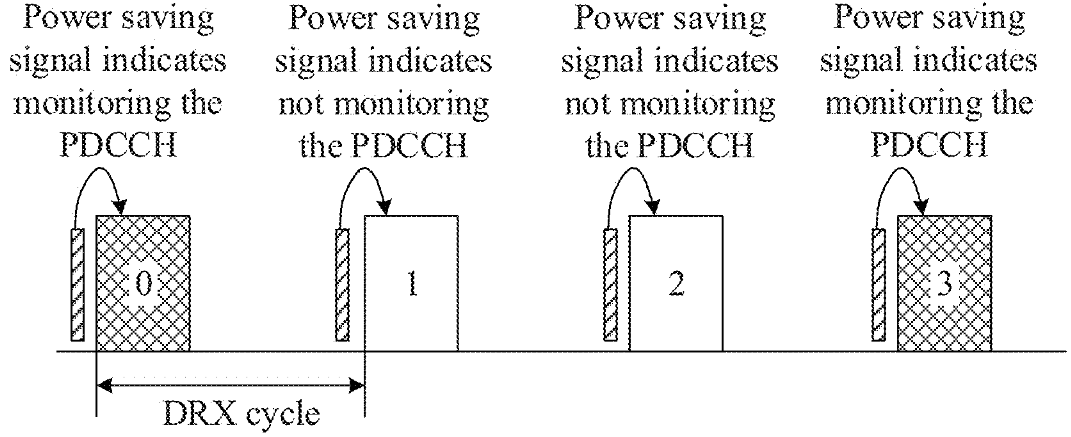
FIG. 2 is a schematic diagram of a power saving signal indicating whether to monitor a PDCCH according to an embodiment of the disclosure.

In order to optimize the power saving of the terminal device, a power saving signal is introduced. The power saving signal is used in conjunction with the DRX mechanism, and the terminal device receives the power saving signal before the on duration. When the terminal device has a data transmission during a DRX cycle, the terminal device is “woken up” by the power saving signal to monitor the PDCCH during the on duration. Otherwise, when the terminal device has no data transmission in the DRX cycle, the terminal device is not “woken up” by the power saving signal, and the terminal device does not need to monitor the PDCCH during the on duration. Compared with the existing DRX mechanism, the terminal device can omit PDCCH monitoring during the on duration when the terminal device has no data transmission, thus realizing power saving. The time outside the on duration of the terminal device is referred to as a DRX inactive time, and the time in the on duration is referred to as a DRX active time. In an example, a process of indicating whether the terminal device monitors the PDCCH during the on duration by the power saving signal is illustrated in FIG. 2.

Figure 3:
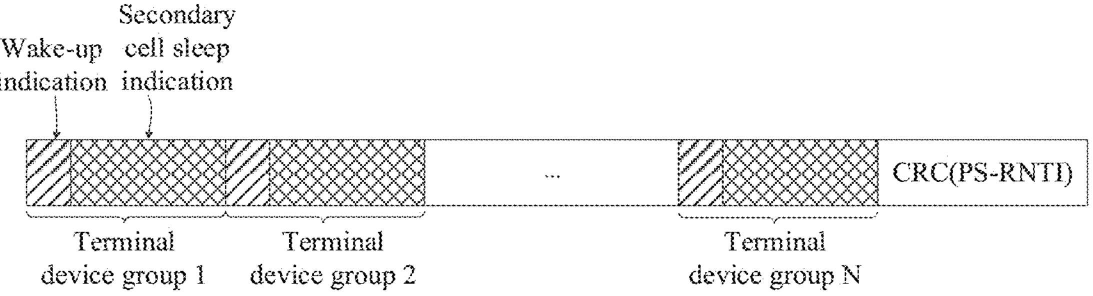
FIG. 3 is a schematic diagram of power saving indication information corresponding to multiple users carried in a power saving wake-up signal according to an embodiment of the disclosure.

The power saving signal may be carried in a newly defined DCI format 2_6. The network configures the terminal device to detect a search space set of the PDCCH carrying DCI format 2_6. The number of bits required by a single user is at most six in the power saving signal, including one bit for wake-up indication and at most five bits for secondary cell sleep indication. The power saving signal carries indication bits for multiple users to improve resource utilization efficiency. As illustrated in FIG. 3, the network notifies a starting position of power saving indication bits of each user in a downlink control information (DCI), and the number of bits for a single user may be implicitly obtained from a configured number of secondary cell (carrier) groups (the wake-up indication bit must be present, and the number of secondary cell (carrier) sleep indication bits may be zero). Further, the network may also notify the terminal device of a total number of bits in the DCI and the PS-RNTI for scrambling the PDCCH.

There is a timing relationship between a monitoring occasion for the PDCCH (called as a PDCCH monitoring occasion for short) and a time window of the on duration (also called as DRX On Duration, or DRX On). The network configures a time offset (PS-offset) for determining a starting point of the PDCCH monitoring occasion. An ending point of the PDCCH monitoring occasion needs to be further determined after the starting point of the PDCCH monitoring occasion is determined. The ending point of the PDCCH monitoring occasion is determined by a capability of the terminal device. The terminal device needs to perform operations, including waking up and initializing after waking up, in a minimum time interval before the on duration. Therefore, the terminal device does not need to monitor the power saving signal in the minimum time interval before the on duration. The terminal with a faster processing speed may use a shorter minimum time interval, see value 1 in the table below, while the terminal with a lower processing speed may use a longer minimum time interval, see value 2 in the table below.

TABLE 1

| Subcarrier spacing (kHz) | Minimum time interval (slots) | |
|---|---|---|
| | Value 1 | Value 2 |
| 15 | 1 | 3 |
| 30 | 1 | 6 |
| 60 | 1 | 12 |
| 120 | 2 | 24 |

Figures 4, 5, 6:
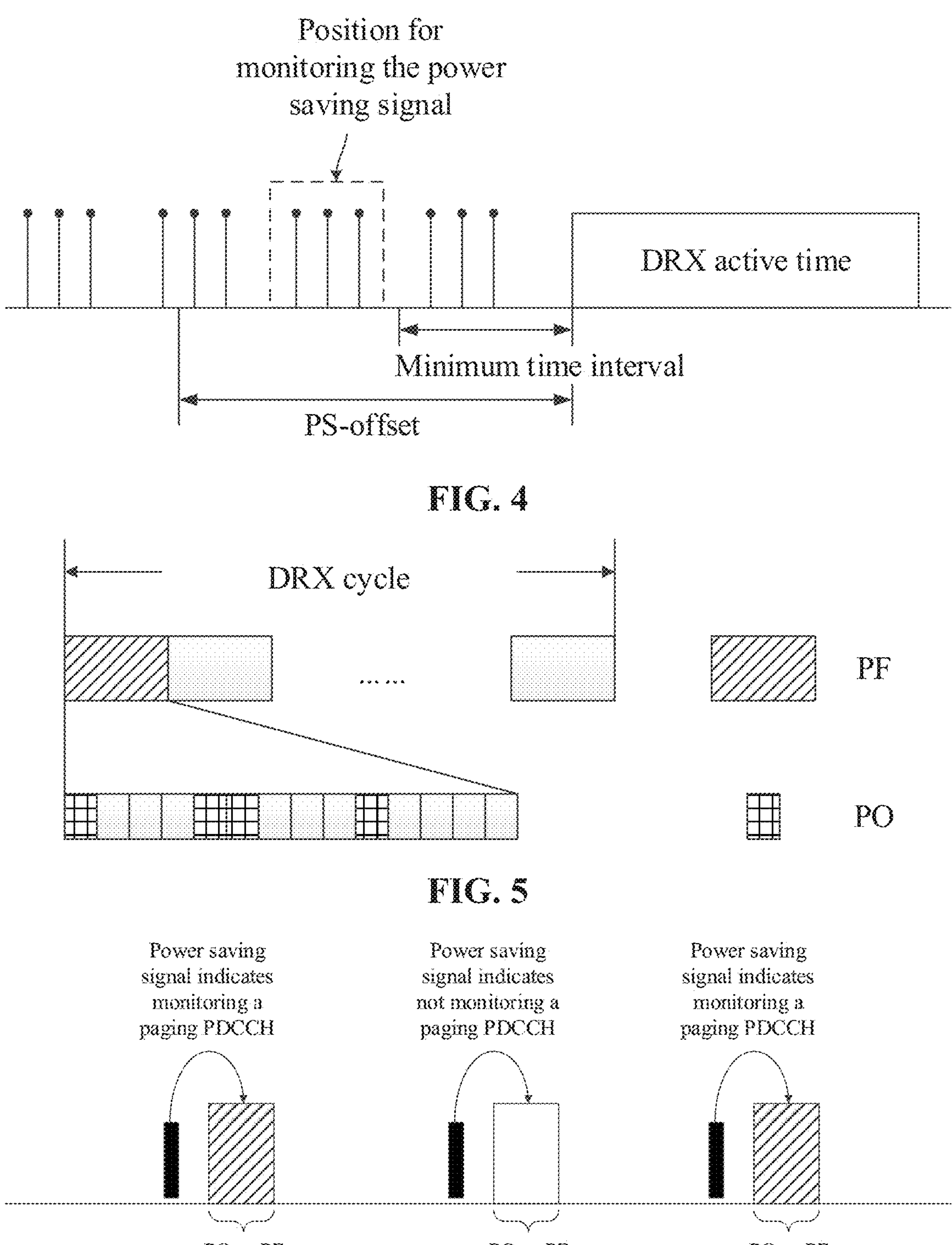
FIG. 4 is a schematic diagram of a monitoring position for a power saving signal according to an embodiment of the disclosure.
FIG. 5 is a schematic diagram of a paging frame (PF) and a PO according to an embodiment of the disclosure.
FIG. 6 is a schematic diagram of a power saving signal indicating whether to monitor a paging PDCCH according to an embodiment of the disclosure.

A time position indicated by the PS-offset that is configured by the network is determined as a starting point, and the power saving signal is monitored within a complete PDCCH monitoring occasion after the starting point (the PDCCH monitoring occasion is defined by a parameter “duration” of the PDCCH search space). The monitored power saving signal is transmitted before a time period corresponding to the minimum time interval. As illustrated in FIG. 4, the power saving signal is monitored by the terminal device at the monitoring position indicated by a dashed line box. The monitoring position marked by the dashed line box is a complete PDCCH monitoring occasion after the starting point of the time position indicated by the PS-offset.

Paging

In an NR system, a network may transmit a paging message to a terminal device in an RRC idle state or an RRC inactive state. The paging process may be triggered by a core network or a base station, and used for transmitting a paging request to the terminal device in the RRC idle state or the RRC inactive state, notifying an update of system information, and notifying the terminal device to receive information such as earthquake and tsunami warning service (ETWS) information and commercial mobile alert service (CMAS) information. The base station decodes contents in the paging message after receiving the paging message from the core network, to obtain a tracking area identity (TAI) list (TA list) of the terminal device, and performs paging via the air interface in a cell, under the coverage of the base station, belonging to the tracking area in the list. A core network field of the paging message is not decoded at the base station, and is transmitted to the terminal device transparently. After receiving the paging messages from the core network, the base station aggregates the paging messages of the terminal devices with the same PO into a piece of paging message, and transmits the piece of paging message to the related terminal devices through a paging channel. The terminal device receives a paging parameter through a system message, calculates the PO in combination with its own UE_ID, and receives the paging message in the corresponding PO. The paging message is carried in a physical downlink shared channel (PDSCH), and the terminal device obtains paging indication information by detecting the PDCCH scrambled with the P-RNTI, so as to receive the paging message. The terminal device in the RRC idle state may save power through the DRX, the terminal device may monitor the PDCCH scrambled with the P-RNTI at a PO in a PF in a DRX cycle, and then receive the paging message. The terminal device obtains configuration information associated with the DRX from a system information block (SIB) 2.

The PF indicates a system frame number (SFN) in which the paging message occurs, and the PO indicates a time at which the paging message may occur. The PF may include one or more POs, and the terminal device only needs to monitor its own PO in each DRX cycle or paging cycle.

An SFN satisfying the following formula may be used as a PF.

$$(SFN + \text{PF\_offset}) \bmod T = (T\ div\ N) * (\text{UE\_ID} \bmod N).$$

An index of the PO, corresponding to the terminal device, in the PF, i.e. i_s, may be calculated according to the following formula.

$$\text{i\_s} = \text{floor}\left(\text{UE\_ID}/N\right) \bmod Ns.$$

T represents the DRX cycle of the terminal device. If a default DRX cycle indicated in the system message is recorded as T_sib, then T=min (T_ue, T_sib) if the DRX value T_ue of the terminal device is configured. If T_ue is not configured, the default value indicated in the system message may be used, i.e., T=T_sib. UE_ID=(5G-S-TMSI mod 1024), where 5G-S-TMSI is identification information of the terminal device. N is the number of PFs in T. Ns is the number of POs in a PF. PF_offset is a frame offset for determining the PF. For example, the position of the PF in the DRX cycle and the position of the PO in the PF are illustrated in FIG. 5.

The terminal device in the RRC idle state periodically monitors the paging PDCCH in the PO corresponding to the terminal device. However, in practice, a probability that the terminal device may be paged is not high. The terminal device periodically monitors the paging PDCCH in the corresponding PO, but may monitor no paging PDCCH sent to itself, which may cause waste of power. Similar to the power saving of the terminal device in the RRC connected state, the power saving of the terminal device in the RRC idle state when receiving the paging message is optimized, and a similar power saving signal is introduced. The power saving signal, called a paging early indication (PEI), indicates whether the terminal device monitors a paging PDCCH in a target PO before the target PO arrives. The power saving signal may be a sequence-based signal or a PDCCH-based signal. The PDCCH carrying the power saving signal may follow the existing PDCCH design, and it is easy to be compatible and multiplexed with existing systems and other channels. The PDCCH-based power saving signal may carry additional power saving information such as sub-grouping information for indicating a sub-grouping corresponding to the power saving information. The sub-grouping is a further grouping for a plurality of terminal devices corresponding to one PO by UE_ID calculation, and the sub-grouping information may be combined with the power saving information to indicate more finely whether a terminal device needs to receive paging in the target PO. As illustrated in FIG. 6, the power saving signal indicates whether one or more sub-groups of terminal devices monitor the paging PDCCH in the corresponding PF or PO.

In the NR technology, the base station has no knowledge of beams for sending paging to the terminal device in the RRC idle state, and thus a beam scanning is used to send paging. To support multi-beam transmission for paging, one PO is defined as a set of PDCCH monitoring occasions, and one PF may include one or more POs or starting time points of the POs. Since each synchronization signal/physical broadcast channel block (SS/PBCH Block, SSB) index corresponds to a respective PDCCH monitoring occasion and different SSB indexes correspond to different beams, when an ID of the paging search space is equal to 0, i.e., SearchSpaceId=0, the multi-beam transmission for the paging may be supported through a plurality of PDCCH monitoring occasions, corresponding to different SSB indexes, in one PO. In the case of SearchSpaceId≠0, one PO includes "S*X" continuous PDCCH monitoring occasions, where S is the number of SSBs actually transmitted, and S is indicated by ssb-PositionsInBurst information in SIB1; X denotes the number of PDCCH monitoring occasions corresponding to each SSB, and X is indicated by nrofPDCCH-MonitoringOccasionPerSSB-InPO information. The value of X is 1 when the parameter X is not configured. The [x*S+K]-th PDCCH monitoring occasion in a PO corresponds to the K-th SSB actually transmitted, where x=0, 1, . . . , X−1, K=1, 2, . . . , S. For example, if S=8 and X=2, one PO contains 16 PDCCH monitoring occasions, and the SSB indexes corresponding to the 16 PDCCH monitoring occasions in chronological order are "0123456701234567", where the index numbers of eight SSBs are 0 to 7, respectively.

SSB Transmission

The synchronization signal in NR is in form of SSB, including primary synchronization signal (PSS), secondary synchronization signal (SSS) and physical broadcast channel (PBCH). The PSS occupies one symbol, the SSS occupies one symbol and the PBCH occupies two symbols. A time-frequency resource occupied by the PBCH carries a demodulation reference signal (DMRS) for demodulation of the PBCH.

The SSB in the NR system covers the whole cell by means of multi-beam scanning, which is convenient for being received by the terminal device in the cell. The multi-beam transmission of the SSB is realized by defining an SSB burst set, which may also be called an SSB set. An SSB burst set includes one or more SSBs, and one SSB carries a synchronization signal and a broadcast channel of one beam. Therefore, the SSB burst set may include synchronization signals of up to L beams within the cell, where L is associated with a frequency band of the system. For example, if a range of the frequency band is less than 3 GHz, L=4; if the range of the frequency band is greater than or equal to 3 GHz and less than 6 GHz, L=8; and if the range of the frequency band is greater than or equal to 6 GHz and less than 52.6 GHz, L=64.

All SSBs in the SSB burst set are transmitted within a time window of 5 ms, i.e., within a half-frame, and are repeatedly transmitted at a certain period of time. The period of the SSB is configured by a high layer parameter SSB-PeriodicityServingCell. For example, the period of the SSB is 5 ms, 10 ms, 20 ms, 40 ms, 80 ms, 160 ms, etc.

The terminal device in the RRC idle state or the RRC inactive state is woken up early from a "sleeping" state and performs time-frequency synchronization and automatic gain control (AGC) through the SSB. In order to reduce the power consumption of the terminal device for receiving the SSB when waking up early, it is necessary to define an appropriate position of a time window (called a target time window) for monitoring the PEI, so that terminal device may stop detecting the SSB burst set based on the PEI when no corresponding PO is required to be monitored, so as to reduce power consumption. However, for a monitoring occasion of the power saving signal, there is still no relevant solution at present that specifies how to determine a time window for monitoring the power saving signal, and thus the terminal device cannot receive the power saving signal effectively.

In some optional implementations, a method for defining the position of the time window for monitoring the PEI includes determining the position of the time window based on a time offset between the time window for monitoring the PEI and an SSB burst set prior to the time window. In other optional implementations, the method for defining the position of the time window for monitoring the PEI includes determining the position of the time window based on an offset between the time window for monitoring the PEI and a starting time of the PO or PF.

For ease of understanding the technical solutions in the embodiments of the disclosure, the technical solutions in the disclosure are described below in detailed embodiments. The above related technologies are used as optional solutions and may be combined with the technical solutions in the embodiments of the disclosure in various ways, and the combination falls within the scope of protection of the embodiments of the disclosure. The embodiments of the disclosure include at least part of the following contents.

Figure 7:
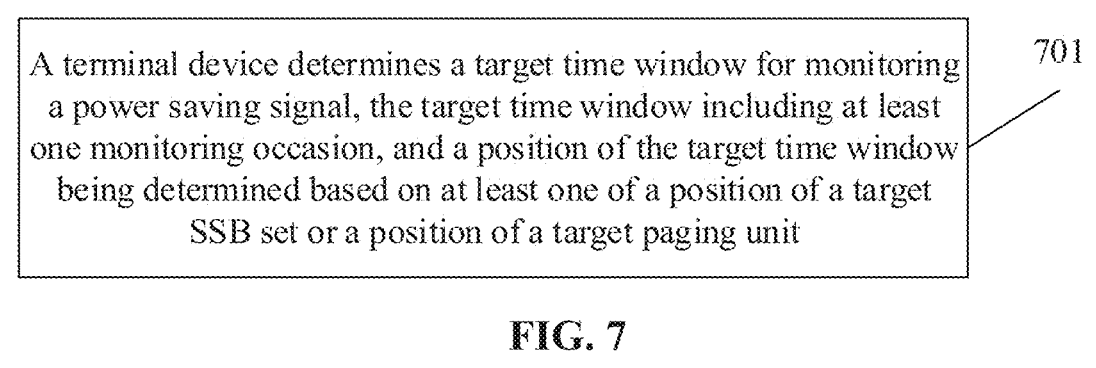

FIG. 7 is a schematic flowchart of a method for determining a time window according to an embodiment of the disclosure. As illustrated in FIG. 7, the method for determining a time window includes the following operation.

At operation 701, a terminal device determines a target time window for monitoring a power saving signal. The target time window includes at least one monitoring occasion, and a position of the target time window is determined based on at least one of a position of a target SSB set or a position of a target paging unit.

In the embodiment of the disclosure, the target time window is a time window for monitoring the power saving signal. In some optional implementations, the terminal device monitors the power saving signal at all or part of the monitoring occasions within the target time window after the terminal device determines the target time window.

In some optional implementations, the position of the target time window is determined based on the position of the target SSB set. Further, optionally, the position of the target SSB set is determined based on the position of the target paging unit.

In some optional implementations, the position of the target time window is determined based on the position of the target paging unit.

In some optional implementations, the power saving signal is a PEI signal. It should be noted that the name of the power saving signal is not limited in the disclosure.

In should be noted that, the monitoring occasion in the embodiments of the disclosure is an occasion for monitoring the power saving signal. Taking the power saving signal as the PEI signal as an example, the monitoring occasion is an occasion for monitoring PEI.

In some optional implementations, the power saving signal is carried in a PDCCH, and the monitoring occasion is an occasion for monitoring the PDCCH (called as a PDCCH monitoring occasion for short).

In some optional implementations, the power saving signal is carried in a reference signal, and the monitoring occasion is an occasion for transmitting the reference signal. Further, optionally, the reference signal includes at least one of: a tracking reference signal (TRS), a channel state information-reference signal (CSI-RS) or a secondary synchronization signal (SSS).

In an embodiment of the disclosure, the operation that the terminal device determines the target time window may be understood as the terminal device determining a position of the target time window, such as a time domain position. The operation is illustrated as follows.

First Solution

In an embodiment of the disclosure, a first time offset is present between the position of the target time window and the position of the target SSB set. The target SSB set is a Pth SSB set before the target paging unit, P being a positive integer.

In some optional implementations, M SSB sets are present between the target time window and the target paging unit, M being a positive integer, P=M or P=M+1. In some optional implementations, a value of M is configured by a network or is predefined.

In the case of P=M, the target SSB set is an SSB set located after and immediately adjacent to the target time window.

In the case of P=M+1, the target SSB set is an SSB set located before and immediately adjacent to the target time window.

In an embodiment of the disclosure, the terminal device determines the position of the target paging unit, determines the position of the target SSB set based on the position of the target paging unit, and determines the position of the target time window based on the position of the target SSB set.

In an example, the terminal device determines a PO or PF corresponding to itself as the target paging unit, determines the P-th SSB set before the target paging unit as the target SSB set, and determines the position of the target time window based on a first time offset and the position of the target SSB set.

In some optional implementations, the first time offset is configured by the network through a first configuration parameter. Accordingly, the terminal device determines at least one of a starting time of the target time window, an ending time of the target time window or a duration of the target time window based on the first configuration parameter.

In some optional implementations, the first configuration parameter includes at least one of a first parameter, a second parameter or a third parameter.

The first parameter indicates an offset of the starting time of the target time window relative to a starting time or an ending time of the target SSB set.

The second parameter indicates an offset of the ending time of the target time window relative to the starting time or the ending time of the target SSB set.

The third parameter indicates the duration of the target time window.

In an example, the first configuration parameter includes the first parameter and the second parameter. The first parameter indicates the offset of the starting time of the target time window relative to the starting time or the ending time of the target SSB set, and the second parameter indicates the offset of the ending time of the target time window relative to the starting time or the ending time of the target SSB set.

In an example, the first configuration parameter includes the first parameter and the third parameter. The first parameter indicates the offset of the starting time of the target time window relative to the starting time or the ending time of the target SSB set, and the third parameter indicates the duration of the target time window.

In an example, the first configuration parameter includes the second parameter and the third parameter. The second parameter indicates the offset of the ending time of the target time window relative to the starting time or the ending time of the target SSB set, and the third parameter indicates the duration of the target time window.

Second Solution

In an embodiment of the disclosure, a second time offset is present between the position of the target time window and the position of the target paging unit. The second time offset includes M SSB sets, M being a positive integer.

The second time offset includes M SSB sets, which may also be understood as M SSB sets being present between the target time window and the target paging unit. In some optional implementations, a value of M is configured by a network or is predefined.

In an embodiment of the disclosure, the terminal device determines the position of the target paging unit, and determines the position of the target time window based on the position of the target paging unit.

In an example, the terminal device determines a PO or PF corresponding to itself as the target paging unit, and determines the position of the target time window based on the second time offset and the position of the target paging unit.

In some optional implementations, the second time offset is configured by the network through a first configuration parameter. Accordingly, the terminal device determines at least one of a starting time of the target time window, an ending time of the target time window or a duration of the target time window based on the first configuration parameter.

In some optional implementations, the first configuration parameter includes at least one of a first parameter, a second parameter or a third parameter.

The first parameter indicates an offset of the starting time of the target time window relative to a starting time or an ending time of the target paging unit.

The second parameter indicates an offset of the ending time of the target time window relative to the starting time or the ending time of the target paging unit.

The third parameter indicates the duration of the target time window.

In an example, the first configuration parameter includes the first parameter and the second parameter. The first parameter indicates the offset of the starting time of the target time window relative to the starting time or the ending time of the target paging unit, and the second parameter indicates the offset of the ending time of the target time window relative to the starting time or the ending time of the target paging unit.

In an example, the first configuration parameter includes the first parameter and the third parameter. The first parameter indicates the offset of the starting time of the target time window relative to the starting time or the ending time of the target paging unit, and the third parameter indicates the duration of the target time window.

In an example, the first configuration parameter includes the second parameter and the third parameter. The second parameter indicates the offset of the ending time of the target time window relative to the starting time or the ending time of the target paging unit, and the third parameter indicates the duration of the target time window.

In the above solutions in the embodiments of the disclosure, the target paging unit is a PO or a PF corresponding to the terminal device.

In some optional implementations, the terminal device may determine an SFN of the PF corresponding to the terminal device by the following formula: (SFN+PF_offset) mod T=(T div N)*(UE_ID mod N).

In some optional implementations, the terminal device may determine the index i_s of the PO corresponding to the terminal device by the following formula: i_s=floor (UE_ID/N) mod Ns.

In the above solutions, T represents a DRX cycle of the terminal device. A default DRX cycle indicated in a system message is recorded as T_sib. If the DRX value T_ue of the terminal device is configured, then T=min (T_ue, T_sib). If T_ue is not configured, the default value indicated in the system message may be used, i.e., T=T_sib.

In the above solutions, UE_ID is UE_ID of the terminal device, and optionally, UE_ID=(5G-S-TMSI mod 1024), where 5G-S-TMSI is identification information of the terminal device.

In the above solutions, N is the number of PFs in T. Ns is the number of POs in a PF. PF_offset is a frame offset for determining the PF.

In the above solutions of the embodiments of the disclosure, optionally, the starting time of the target SSB set may be defined as follows.

Option 1-1), the starting time of the target SSB set is a starting time of a half-frame occupied by the target SSB set.

Option 2-1), the starting time of the target SSB set is a starting time of a first SSB in the target SSB set.

Option 3-1), the starting time of the target SSB set is a starting time of a slot occupied by a first SSB in the target SSB set.

In the above solutions of the embodiments of the disclosure, optionally, the ending time of the target SSB set may be defined as follows.

Option 2-1), the ending time of the target SSB set is an ending time of a half-frame occupied by the target SSB set.

Option 2-2), the ending time of the target SSB set is an ending time of a last SSB in the target SSB set.

Option 3-2), the ending time of the target SSB set is an ending time of a slot occupied by a last SSB in the target SSB set.

In the above solutions of the embodiments of the disclosure, optionally, the starting time of the target time window may be defined as a starting time of a first monitoring occasion in the target time window.

In the above solutions of the embodiments of the disclosure, optionally, the ending time of the target time window may be defined as an ending time of a last monitoring occasion in the target time window.

It should be noted that the definitions of the starting time and the ending time in the above technical solutions may be combined in any way and implemented.

It should be noted that the SSB set in the above technical solutions refers to the SSB burst set, and the "SSB burst set" may refer to the description of the above related solutions for understanding.

The technical solutions in the embodiments of the disclosure will be illustrated below with reference to specific application examples. It should be noted that in the following application examples, the case in which the paging unit is a PO is illustrated as an example, and the case in which the paging unit is a PF is also applicable to the following application examples. It should be noted that the following application examples are illustrated with the power saving signal being a PEI, and accordingly, the monitoring occasion may be called a PEI monitoring occasion.

First Application Example

In an embodiment of the disclosure, M SSB sets are present between a time window (i.e., the target time window) for monitoring a PEI and a target PO. The target PO is a PO corresponding to the terminal device.

In order to enable the PEI to be sent to the terminal device early to reduce the power consumption of the terminal device for receiving the SSB before the target PO when the terminal device is woken up early, the time window for monitoring the PEI may be set before the position of the M-th SSB set or after the position of the (M+1)-th SSB set before the target PO. In other words, the time window for monitoring the PEI is separated from the target PO by M SSB sets. The parameter M may be configured by the network or predefined.

The position of the time window for monitoring the PEI may be determined according to the position of the target SSB set. The target SSB set is the P-th SSB set before the target PO, P=M, or P=M+1. When P=M, the position of the time window for monitoring the PEI is determined according to the position of the M-th SSB set before the target PO, and the position of the time window for monitoring the PEI is located before the position of the M-th SSB set before the target PO. When P=M+1, the position of the time window for monitoring the PEI is determined according to the position of the (M+1)-th SSB set before the target PO, and the position of the time window for monitoring the PEI is located after the position of the (M+1)-th SSB set before the target PO.

Figure 8:
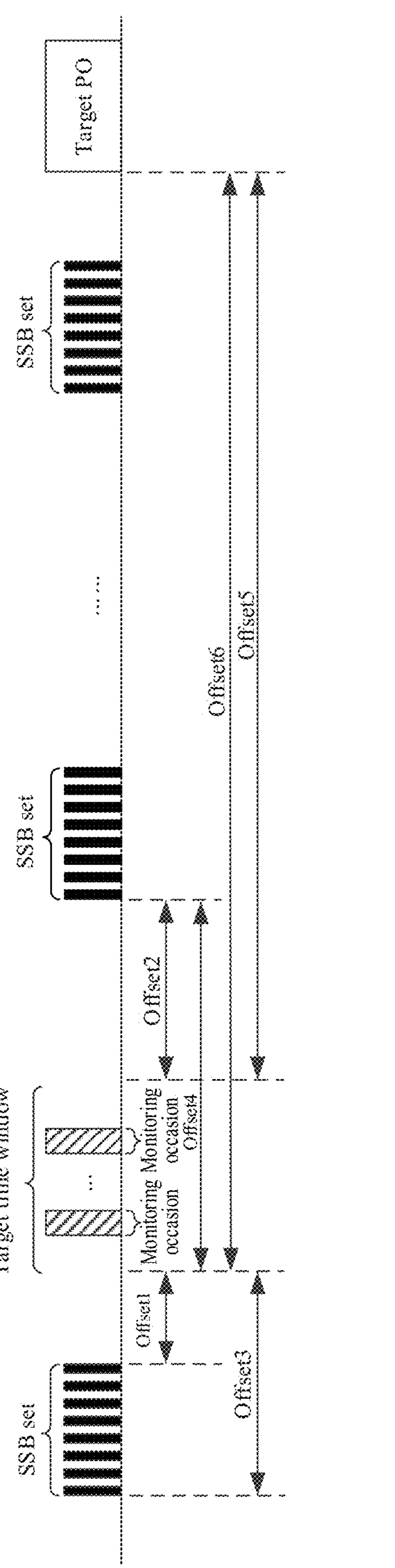
FIG. 8 is a schematic diagram of a temporal relationship corresponding to a target time window according to an embodiment of the disclosure.

FIG. 8 illustrates a schematic diagram of a temporal relationship between the position of the time window for monitoring the PEI and the position of the target SSB set. The position of the target SSB set is determined based on the position of the target PO, and the target SSB set may be an SSB set after and immediately adjacent to the time window for monitoring the PEI or an SSB set before and immediately adjacent to the time window for monitoring the PEI. The temporal relationship between the position of the target SSB set and the position of the time window for monitoring the PEI is configured by the network.

In a first case, the target SSB set is the nearest SSB set before the target time window, and the network may configure the following parameters Offset1 and Offset3.

Offset1 indicates a time offset between a starting time of the target time window and an ending time of the nearest SSB set before the target time window.

Offset3 indicates a time offset between the starting time of the target time window and a starting time of the nearest SSB set before the target time window.

The terminal device may determine the position of the time window for monitoring the PEI based on the above parameters configured by the network in combination with the position of the target SSB set.

In a second case, the target SSB set is the nearest SSB set after the target time window, and the network may configure the following parameters Offset2 and Offset4.

Offset2 indicates a time offset between an ending time of the target time window and a starting time of the nearest SSB set after the target time window.

Offset4 indicates a time offset between the starting time of the target time window and a starting time of the nearest SSB set after the target time window.

The terminal device may determine the position of the time window for monitoring the PEI based on the above parameters configured by the network in combination with the position of the target SSB set.

Second Application Example

In an embodiment of the disclosure, M SSB sets are present between a time window (i.e., a target time window) for monitoring a PEI and a target PO. The target PO is a PO corresponding to the terminal device.

In order to enable the PEI to be sent to the terminal device early to reduce the power consumption of the terminal device for receiving the SSB before the target PO when the terminal device is woken up early, the time window for monitoring the PEI may be set before the target PO and may be separated from the target PO by M SSB sets. The parameter M may be configured by the network or predefined.

The position of the time window for monitoring the PEI may be determined based on the position of the target PO. FIG. 8 illustrates a schematic diagram of a temporal relationship between the position of the time window for monitoring the PEI and the position of the target PO. The temporal relationship between the position of the target PO and the position of the time window for monitoring the PEI is configured by the network. Specifically, the network may configure the following parameters Offset5 and Offset6.

Offset5 indicates a time offset between an ending time of the target time window and a starting time of the target PO.

Offset6 indicates a time offset between a starting time of the target time window and the starting time of the target PO.

The terminal device may determine the position of the time window for monitoring the PEI based on the above parameters configured by the network in combination with the position of the target PO.

Third Application Example

The Offset1 to Offset6 in FIG. 8 are defined with reference to the starting time or the ending time of the target time window, the target SSB set, and the target PO.

For the target time window, the target time window includes several monitoring occasions, and the starting time of the target time window may be determined as a starting time of the first monitoring occasion among the several monitoring occasions in the target time window. The ending time of the target time window may be determined as an ending time of the last monitoring occasion among the several monitoring occasions in the target time window.

For the target SSB set, the starting time of the target SSB set may be determined as: a starting time of a half-frame occupied by the target SSB set; or a starting time of the first SSB in the target SSB set; or a starting time of a slot occupied by the first SSB in the target SSB set. The ending time of the target SSB set may be determined as: an ending time of the half-frame occupied by the target SSB set; or an ending time of the last SSB in the target SSB set; or an ending time of a slot occupied by a last SSB in the target SSB set.

Figures 9, 10, 11:
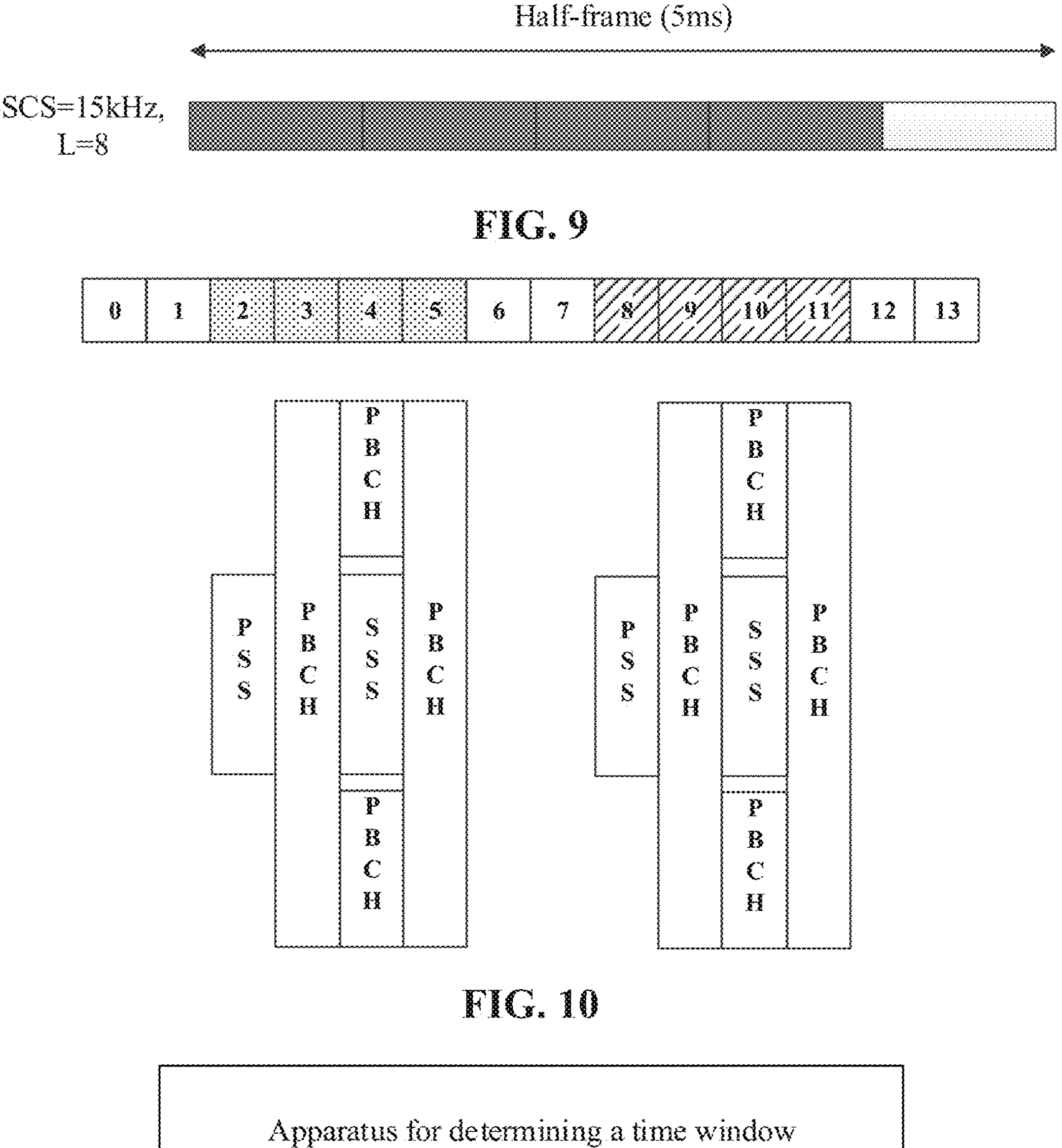
FIG. 9 is a schematic diagram of a position of an SSB set in a half-frame according to an embodiment of the disclosure.
FIG. 10 is a schematic diagram of a position of an SSB in a slot according to an embodiment of the disclosure.
FIG. 11 is a schematic diagram of a composition structure of an apparatus for determining a time window according to an embodiment of the disclosure.

In an example, the target SSB set includes eight SSBs and a subcarrier spacing is 15 kHz. The position of the SSB set in a half-frame of 5 ms is illustrated in FIG. 9, which is located in first four slots. Each slot includes two SSBs, and the positions of the two SSBs in the slot are illustrated in FIG. 10. Each SSB is composed of a PSS, an SSS and a PBCH, in which the PSS and SSS each occupy one symbol, and the PBCH occupies two symbols. The starting time of the target SSB set may be the starting time of the half-frame of 5 ms occupied by the target SSB set, or the starting time of the first SSB in the target SSB set, or the starting time of the slot occupied by the first SSB in the target SSB set. The ending time of the target SSB set may be the ending time of the half-frame of 5 ms occupied by the target SSB set, or the ending time of the last SSB in the target SSB set, or the ending time of the slot occupied by the last SSB in the target SSB set.

For the target PO, the starting time of the target PO is a starting time of a time domain position of the PO, and the ending time of the target PO is an ending time of the time domain position of the PO.

It should be noted that the definitions of the starting time and the ending time mentioned above may be combined in any way.

The position of the target time window can be determined conveniently according to the technical solution in the embodiments of the disclosure, so that the terminal device can determine the positions of various monitoring occasions within the target time window correctly, thereby receiving the PEI correctly at the correct monitoring occasion.

Preferred embodiments of the disclosure have been described in detail with reference to the accompanying drawings. However, the disclosure is not limited to the specific details in the above embodiments. Various simple modifications may be made to the technical solutions of the present disclosure within the scope of the technical conception of the disclosure, and these simple modifications all fall within the scope of protection of the disclosure. For example, various specific technical features described in the above specific embodiments may be combined in any suitable manner without contradiction, and various possible combinations are not further described in the disclosure in order to avoid unnecessary repetition. For another example, various embodiments of the disclosure may also be combined in any manner as long as the combination does not depart from the idea of the disclosure, and the combinations are also considered to be the content disclosed by the disclosure. For another example, various embodiments described in the disclosure and/or the technical features in the embodiments may be combined with the related art in any manner on the premise of no conflict, and the combined technical solution should also fall within the scope of protection of the disclosure.

It should be understood that in various method embodiments of the disclosure, the sequence number of the above-mentioned process does not mean the execution order, the execution order of each process is determined by its function and inherent logic, and shall not constitute any limitation on the implementation process of the embodiments of the disclosure. Further, in the embodiments of the disclosure, the terms "downlink", "uplink" and "sidelink" are used for representing a transmission direction of a signal or data. The term "downlink" is used for indicating that the transmission direction of the signal or data is a first direction from a site to a UE of a cell, the term "uplink" is used for indicating that the transmission direction of the signal or data is a second direction from the UE of the cell to the site, and the term "sidelink" is used for indicating that the transmission direction of the signal or data is a third direction from a first UE to a second UE. For example, the "downlink signal" means that the transmission direction of the signal is the first direction. In addition, in the embodiments of the disclosure, the term "and/or" is only an association relationship for describing the associated objects, and represents that three relationships may exist. Specifically, A and/or B may represent the following three cases: A exists separately, both A and B exist, and B exists separately. In addition, the character "/" in this specification generally indicates an "or" relationship between the associated objects.

FIG. 11 a schematic diagram of a composition structure of an apparatus for determining a time window according to an embodiment of the disclosure, which is applicable to the terminal device. As illustrated in FIG. 11, the apparatus for determining a time window includes a determination unit 1101.

The determination unit is configured to determine a target time window for monitoring a power saving signal. The target time window includes at least one monitoring occasion, and a position of the target time window is determined based on at least one of a position of a target SSB set or a position of a target paging unit.

In some optional implementations, a first time offset is present between the position of the target time window and the position of the target SSB set. The target SSB set is a Pth SSB set before the target paging unit, P being a positive integer.

In some optional implementations, M SSB sets are present between the target time window and the target paging unit, M being a positive integer, P=M or P=M+1.

In some optional implementations, a second time offset is present between the position of the target time window and the position of the target paging unit. The second time offset includes M SSB sets, M being a positive integer.

In some optional implementations, a value of M is configured by a network or is predefined.

In some optional implementations, the determination unit 1101 is further configured to determine at least one of a starting time of the target time window, an ending time of the target time window or a duration of the target time window based on a first configuration parameter.

In some optional implementations, the first configuration parameter includes at least one of a first parameter, a second parameter or a third parameter.

The first parameter indicates an offset of the starting time of the target time window relative to a starting time or an ending time of the target SSB set.

The second parameter indicates an offset of the ending time of the target time window relative to a starting time or an ending time of the target SSB set.

The third parameter indicates the duration of the target time window.

In some optional implementations, the first configuration parameter includes at least one of a first parameter, a second parameter or a third parameter.

The first parameter indicates an offset of the starting time of the target time window relative to a starting time or an ending time of the target paging unit.

The second parameter indicates an offset of the ending time of the target time window relative to a starting time or an ending time of the target paging unit.

The third parameter indicates the duration of the target time window.

In some optional implementations, the starting time of the target SSB set is:

a starting time of a half-frame occupied by the target SSB set; or a starting time of a first SSB in the target SSB set; or a starting time of a slot occupied by a first SSB in the target SSB set.

In some optional implementations, the ending time of the target SSB set is:

an ending time of a half-frame occupied by the target SSB set; or an ending time of a last SSB in the target SSB set; or an ending time of a slot occupied by a last SSB in the target SSB set.

In some optional implementations, the starting time of the target time window is a starting time of a first monitoring occasion in the target time window.

In some optional implementations, the ending time of the target time window is an ending time of a last monitoring occasion in the target time window.

In some optional implementations, the target paging unit is a PO or a PF corresponding to the terminal device.

In some optional implementations, the power saving signal is carried in a PDCCH, and the monitoring occasion is an occasion for monitoring the PDCCH.

In some optional implementations, the power saving signal is carried in a reference signal, and the monitoring occasion is an occasion for transmitting the reference signal.

In some optional implementations, the reference signal includes at least one of a TRS, a channel state information-reference signal (CSI-RS) or an SSS.

In some optional implementations, the power saving signal is a PEI signal.

It should be understood by a person of ordinary skill in the art that the relevant description of the above apparatus for determining the time window in the embodiments of the disclosure may be understood with reference to a relevant description of the method for determining the time window in the embodiments of the disclosure.

Figure 12:
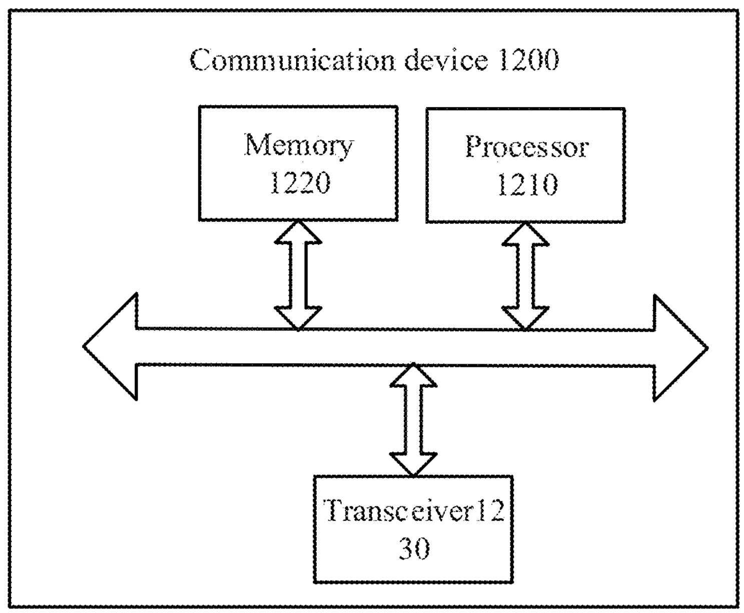
FIG. 12 is a schematic structural diagram of a communication device according to an embodiment of the disclosure.

FIG. 12 is a schematic structural diagram of a communication device 1200 according to an embodiment of the disclosure. The communication device may be a terminal device. The communication device 1200 illustrated in FIG. 12 includes a processor 1210. The processor 1210 may be configured to call and execute a computer program stored in a memory to implement the method according to the embodiment of the disclosure.

Optionally, as illustrated in FIG. 12, the communication device 1200 may further include a memory 1220. The processor 1210 may be configured to call and run the computer program stored in the memory 1220 to implement the method according to the embodiment of the disclosure.

The memory 1220 may be a separate device independent from the processor 1210, or may be integrated into the processor 1210.

Optionally, as illustrated in FIG. 12, the communication device 1200 may further include a transceiver 1230. The processor 1210 may control the transceiver 1230 to communicate with other devices, in particular, to transmit information or data to other devices, or receive information or data from other devices.

The transceiver 1230 may include a transmitter and a receiver. The transceiver 1230 may further include an antenna, and the number of the antennas may be one or more.

Optionally, the communication device 1200 may specifically be a network device in the embodiments of the disclosure. The communication device 1200 may implement corresponding processes that are implemented by the network device in various methods of the embodiments of the disclosure. For brevity, details are not described herein again.

Optionally, the communication device 1200 may specifically be a mobile terminal/terminal device in the embodiments of the disclosure. The communication device 1200 may implement corresponding processes that are implemented by the mobile terminal/terminal device in various methods of the embodiments of the disclosure. For brevity, details are not described herein again.

Figure 13:
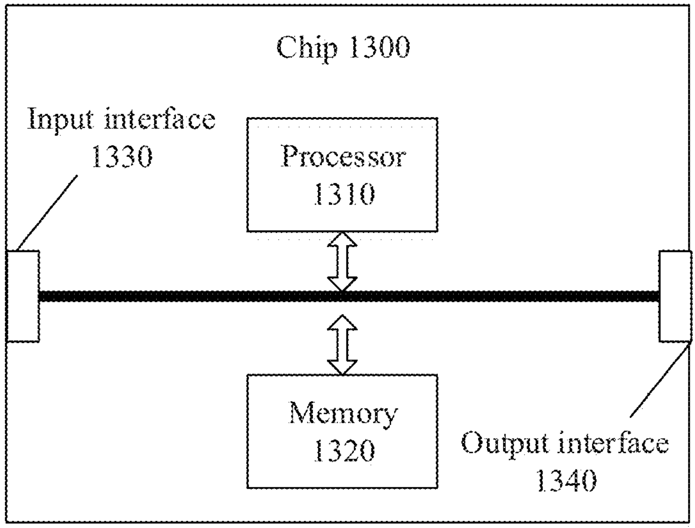
FIG. 13 is a schematic structural diagram of a chip according to an embodiment of the disclosure.

FIG. 13 is a schematic structural diagram of a chip according to an embodiment of the disclosure. The chip 1300 illustrated in FIG. 13 includes a processor 1310. The processor 1310 may be configured to call and run a computer program stored in a memory to implement the method according to the embodiment of the disclosure.

Optionally, as illustrated in FIG. 13, the chip 1300 may further include a memory 1320. The processor 1310 may be configured to call and run the computer program stored in the memory 1320 to implement the method according to the embodiment of the disclosure.

The memory 1320 may be a separate device independent from the processor 1310, or may be integrated into the processor 1310.

Optionally, the chip 1300 may further include an input interface 1330. The processor 1310 may control the input interface 1330 to communicate with other devices or chips, in particular, to obtain information or data from other devices or chips.

Optionally, the chip 1300 may further include an output interface 1340. The processor 1310 may control the output interface 1340 to communicate with other devices or chips, in particular, to output information or data to other devices or chips.

Optionally, the chip may be applied to a network device in the embodiments of the disclosure. The chip may implement corresponding processes that are performed by the network device in various methods of the embodiments of the disclosure. For brevity, details are not described herein again.

Optionally, the chip may be applied to a mobile terminal/terminal device in the embodiments of the disclosure. The chip may implement corresponding processes that are implemented by the mobile terminal/terminal device in various methods of the embodiments of the disclosure. For brevity, details are not described herein again.

It should be understood that, the chip mentioned in the embodiments of the disclosure may be also referred to as a system-level chip, a system chip, a chip system or a system on chip, etc.

Figure 14:
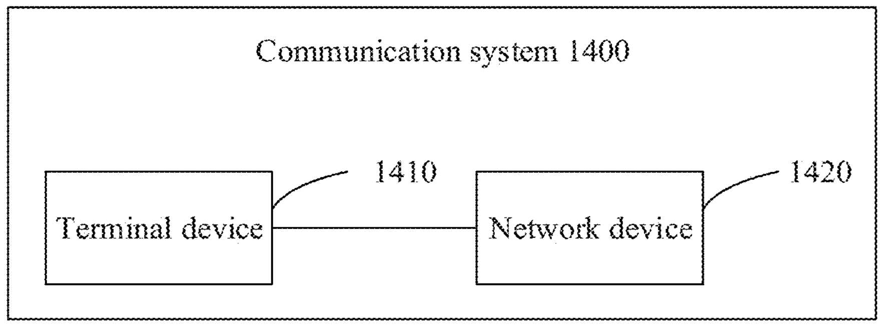
FIG. 14 is a schematic block diagram of a communication system according to an embodiment of the disclosure.

FIG. 14 is a schematic block diagram of a communication system 1400 according to an embodiment of the disclosure. As illustrated in FIG. 14, the communication system 1400 includes a terminal device 1410 and a network device 1420.

The terminal device 1410 may be configured to implement corresponding functions that are implemented by the terminal device in the above method, and the network device 1420 may be configured to implement corresponding functions that are implemented by the network device in the above method. For brevity, details are not described herein again.

With the above technical solutions, a terminal device may determine a target time window for monitoring a power saving signal. A position of the target time window is determined based on at least one of a position of a target SSB set or a position of a target paging unit. In this way, the terminal device can determine a position of a monitoring occasion in the target time window correctly, thereby monitoring the power saving signal in the monitoring occasion corresponding to the power saving signal in a correct way.

It should be understood that, the processor in the embodiments of the disclosure may be an integrated circuit chip, and has a signal processing capability. During implementation, the steps in the foregoing method embodiments may be implemented by using a hardware integrated logic circuit in the processor or implemented by using instructions in a software form. The processor may be a general purpose processor, a Digital Signal Processor (DSP), an Application-Specific Integrated Circuit (ASIC), a Field Programmable Gate Array (FPGA), or another programmable logical device, a discrete gate or transistor logical device, or a discrete hardware component. The processor may implement or perform methods, steps and logical block diagrams disclosed in the embodiments of the disclosure. The general purpose processor may be a microprocessor or the processor may be any conventional processor and the like. The steps of the methods disclosed with reference to the embodiments of the disclosure may be directly executed and completed by means of a hardware decoding processor, or may be executed and completed by using a combination of hardware in the decoding processor and software modules. The software module may be located in a storage medium well established in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with the hardware of the processor.

It can be understood that, the memory in the embodiments of the disclosure may be a volatile memory or a non-volatile memory, or may include both a volatile memory and a non-volatile memory. The non-volatile memory may be a read-only memory (ROM), a programmable read-only memory (PROM), an erasable PROM (EPROM), an electrically EPROM (EEPROM) or a flash memory. The volatile memory may be a random access memory (RAM), and is used as an external cache. By way of illustration, but not limitation, many forms of RAMS may be used, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct rambus RAM (DR RAM). It should be noted that, the memory in the system and the method described herein is intended to include but not limited to these memories and any other suitable types of memories.

It should be understood that, the foregoing description of the memory is an exemplary but not limitative description, for example, the memory in the embodiments of the disclosure may be an SRAM, a DRAM, an SDRAM, a DDR SDRAM, an ESDRAM, an SLDRAM and a DR RAM, etc. That is, the memory in the embodiments of the disclosure is intended to include but not limited to these memories and any other suitable types of memories.

An embodiment of the disclosure further provides a computer-readable storage medium configured to store a computer program.

Optionally, the computer-readable storage medium may be applied to a network device in the embodiments of the disclosure, and the computer program causes a computer to perform corresponding processes that are performed by the network device in various methods of the embodiments of the disclosure. For brevity, details are not described herein again.

Optionally, the computer-readable storage medium may be applied to a mobile terminal/terminal device in the embodiments of the disclosure, and the computer program causes a computer to implement corresponding processes that are implemented by the mobile terminal/terminal device in various methods of the embodiments of the disclosure. For brevity, details are not described herein again.

An embodiment of the disclosure further provides a computer program product including computer program instructions.

Optionally, the computer program product may be applied to a network device in the embodiments of the disclosure, and the computer program instructions cause a computer to perform corresponding processes that are performed by the network device in various methods of the embodiments of the disclosure. For brevity, details are not described herein again.

Optionally, the computer program product may be applied to a mobile terminal/terminal device in the embodiments of the disclosure, and the computer program instructions cause a computer to perform corresponding processes that are implemented by the mobile terminal/terminal device in various methods of the embodiments of the disclosure. For brevity, details are not described herein again.

An embodiment of the disclosure further provides a computer program.

Optionally, the computer program may be applied to a network device in the embodiments of the disclosure. When the computer program is run by a computer, it causes the computer to perform corresponding processes that are performed by the network device in various methods of the embodiments of the disclosure. For brevity, details are not described herein again.

Optionally, the computer program may be applied to a mobile terminal/terminal device in the embodiments of the disclosure. When the computer program is executed by a computer, it causes the computer to perform corresponding processes that are implemented by the mobile terminal/terminal device in various methods of the embodiments of the disclosure. For brevity, details are not described herein again.

A person of ordinary skill in the art may realize that, units and algorithm steps in the examples described in combination with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, a detailed working process of the foregoing system, apparatus, or unit may refer to a corresponding process in the foregoing method embodiments, and details are not described herein again.

In the several embodiments provided in the disclosure, it should be understood that the disclosed system, device, and method may be implemented in other ways. For example, the described apparatus embodiment is merely exemplary. For example, the unit division is merely a logical function division and the units may be divided in other ways in actual implementation. For example, a plurality of units or components may be combined or integrated into another system, or some features may be ignored or not performed. In addition, the displayed or discussed mutual coupling or direct coupling or communication connection may be an indirect coupling or communication connection through some interfaces, devices or units, which may be electrical, mechanical or in other forms.

The units described as separate parts may or may not be physically separated, and parts displayed as units may or may not be physical units, may be located in one place, or may be distributed on a plurality of network units. Some or all of the units may be selected according to actual needs to achieve the objectives of the solutions of the embodiments.

In addition, functional units in the embodiments of the disclosure may be integrated into a processing unit, or each of the units may exist physically and separately, or two or more units are integrated into one unit.

When the functions are implemented in a form of a software functional module and sold or used as an independent product, the functions may be stored in a computer-readable storage medium. Based on such an understanding, the technical solutions of the disclosure essentially, or the part contributing to the prior art, or part of the technical solutions may be embodied in the form of a software product. The computer software product is stored in a storage medium, and includes several instructions for instructing a computer device (which may be a personal computer, a server, a network device, and the like) to perform all or part of the steps in the method described in the embodiments of the disclosure. The foregoing storage medium includes any medium that can store program codes, such as a USB flash disk, a removable hard disk, an ROM, an RAM, a magnetic disk, or an optical disk.

The foregoing descriptions are merely specific implementations of the disclosure, and are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

What is claimed is:

1. A method for determining a time window, comprising:

determining, by a terminal device, a target time window for monitoring a power saving signal, the target time window comprising at least one monitoring occasion, wherein a position of the target time window is determined based on a position of a target synchronization signal/physical broadcast channel block (SSB) set and a position of a target paging unit, or is determined based on the position of the target paging unit;

wherein determining, by the terminal device, the target time window comprises:

determining, by the terminal device, a starting time of the target time window based on a first configuration parameter, wherein the first configuration parameter comprises a first parameter indicating an offset of the starting time of the target time window relative to a starting time of the target paging unit, and the starting time of the target time window is a starting time of a first monitoring occasion in the target time window.

2. The method of claim 1, wherein a first time offset is present between the position of the target time window and the position of the target SSB set, and the target SSB set is a P-th SSB set before the target paging unit, P being a positive integer.

3. The method of claim 1, wherein a second time offset is present between the position of the target time window and the position of the target paging unit, and the second time offset comprises M SSB sets, M being a positive integer.

4. The method of claim 1, wherein determining, by the terminal device, the target time window further comprises:

determining, by the terminal device, at least one of an ending time of the target time window or a duration of the target time window based on the first configuration parameter.

5. The method of claim 4, wherein the first configuration parameter further comprises at least one of:

a second parameter indicating an offset of the ending time of the target time window relative to the starting time or an ending time of the target paging unit; or a third parameter indicating the duration of the target time window.

6. The method of claim 4, wherein the ending time of the target time window is an ending time of a last monitoring occasion in the target time window.

7. The method of claim 1, wherein the target paging unit is a paging occasion (PO) or a paging frame (PF) corresponding to the terminal device.

8. The method of claim 1, wherein the power saving signal is carried in a physical downlink control channel (PDCCH), and the monitoring occasion is an occasion for monitoring the PDCCH.

9. The method of claim 1, wherein the power saving signal is a paging early indication (PEI) signal.

10. An apparatus for determining a time window, applied in a terminal device, the apparatus comprising:

a processor; and a memory for storing a computer program, wherein the processor is configured to call the computer program stored in the memory and run the computer program to:

determine a target time window for monitoring a power saving signal, the target time window comprising at least one monitoring occasion, wherein a position of the target time window is determined based on a position of a target synchronization signal/physical broadcast channel block (SSB) set and a position of a target paging unit, or is determined based on the position of the target paging unit;

wherein the processor is further configured to determine a starting time of the target time window based on a first configuration parameter, wherein the first configuration parameter comprises a first parameter indicating an offset of the starting time of the target time window relative to a starting time of the target paging unit, and the starting time of the target time window is a starting time of a first monitoring occasion in the target time window.

11. The apparatus of claim 10, wherein a first time offset is present between the position of the target time window and the position of the target SSB set, and the target SSB set is a P-th SSB set before the target paging unit, P being a positive integer.

12. The apparatus of claim 10, wherein the processor is further configured to determine at least one of an ending time of the target time window or a duration of the target time window based on the first configuration parameter.

13. The apparatus of claim 12, wherein the first configuration parameter further comprises at least one of:

a second parameter indicating an offset of the ending time of the target time window relative to the starting time or an ending time of the target paging unit; or a third parameter indicating the duration of the target time window.

14. The apparatus of claim 10, wherein the target paging unit is a paging occasion (PO) or a paging frame (PF) corresponding to the terminal device.

15. The apparatus of claim 10, wherein the power saving signal is carried in a physical downlink control channel (PDCCH), and the monitoring occasion is an occasion for monitoring the PDCCH.

16. The apparatus of claim 10, wherein the power saving signal is carried in a reference signal, and the monitoring occasion is an occasion for transmitting the reference signal.

17. The apparatus of claim 10, wherein the power saving signal is a paging early indication (PEI) signal.

18. A chip, comprising a processor configured to call a computer program from a memory and run the computer program to:

determine a target time window for monitoring a power saving signal, the target time window comprising at least one monitoring occasion, wherein a position of the target time window is determined based on a position of a target synchronization signal/physical broadcast channel block (SSB) set and a position of a target paging unit, or is determined based on the position of the target paging unit;

wherein the processor is further configured to call the computer program from the memory and run the computer program to determine a starting time of the target time window based on a first configuration parameter, wherein the first configuration parameter comprises a first parameter indicating an offset of the starting time of the target time window relative to a starting time of the target paging unit, and the starting time of the target time window is a starting time of a first monitoring occasion in the target time window.

19. The chip of claim 18, wherein the power saving signal is carried in a physical downlink control channel (PDCCH), and the monitoring occasion is an occasion for monitoring the PDCCH.

20. The chip of claim 18, wherein the power saving signal is a paging early indication (PEI) signal.

* * * * *